United States Patent [19]
Saitoh

[11] 3,896,896
[45] July 29, 1975

[54] MULTI-PROFILED CROSS MEMBER
[75] Inventor: Shigeru Saitoh, Yokohama, Japan
[73] Assignee: Nissan Motor Company Limited, Yokohama, Japan
[22] Filed: May 22, 1973
[21] Appl. No.: 362,843

[30] Foreign Application Priority Data
May 23, 1972  Japan.............................. 47-60181

[52] U.S. Cl............................. 180/82 R; 280/106 R
[51] Int. Cl.............................................. B60r 19/00
[58] Field of Search............... 180/64 R, 82 R, 91; 280/106 R; 293/63; 296/35 R

[56] References Cited
UNITED STATES PATENTS
2,747,887  5/1956  Schilberg...................... 280/106 R Primary Examiner—M. Henson Wood, Jr.
Assistant Examiner—Randolph A. Reese

[57] ABSTRACT

A frame cross member formed with two or more spaced sections of inverted U-shape or V-shape by which the cross member is secured to a side rail, which is deformable in profile to absorb shock resulting from an impact applied along the length of the side rail.

4 Claims, 24 Drawing Figures

PATENTED JUL 29 1975    3,896,896

SHEET  1

MULTI-PROFILED CROSS MEMBER

The present invention relates to a new and improved manner of connection of a laterally extending cross member to longitudinally extending side members which are specifically designed to be able to absorb shocks applied thereto.

Most vehicle frames comprise a pair of side members or side rails extending along the partial or full length of the motor vehicle. It is known to design at least a portion of the side member to be longitudinally deformable or contractible within a certain limit in response to an impact applied thereto. This is for the purpose of absorbing shock resulting from an impact applied to the front or rear of the vehicle, as encountered when the vehicle collides with an obstacle. It is usual to provide several profiled cross members which extend laterally inward from the side rails and are connected at each end to the respective side rails, for the purpose of reinforcing the frame and supporting components such as the engine, power-transmission system and suspension system.

In a conventional manner, a generally U-shaped cross member has been connected at the top of its profile to the underside of the side rail along the full width of the cross member. Since this connecting area is relatively rigid against deformation, the contractivity of the side rails, which with no cross member connection may evenly deform along the entire length of the deformable portion, has been sacrificed within this considerably large connecting area. This fact has necessarily affected the shock absorbing characteristics of the side rails.

It is therefore a primary object of the invention to alleviate the above described difficulties encountered in the known configuration.

It is another object of the invention to provide a new and improved manner of connecting a cross member to specially designed deformable side rails of a motor vehicle frame.

It is a further object of the invention to provide an improved chassis frame which has an increased shock absorbing effect upon collision of the vehicle.

Other objects and advantages of the invention will be readily apparent from the following description and appended claims, with reference to the accompanying drawings, in which:

Figure 3:
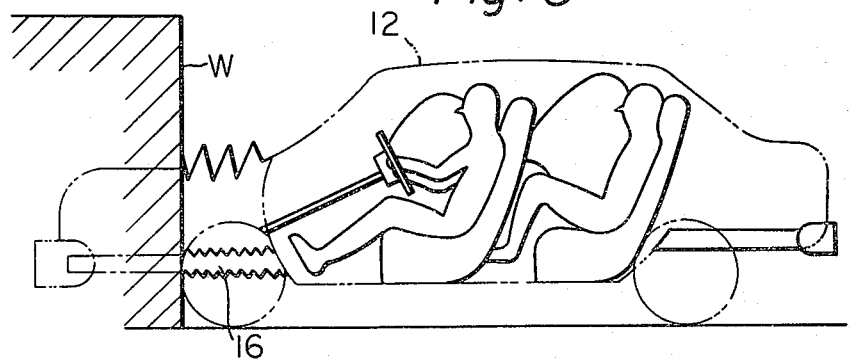
FIG. 3 is a view similar to FIG. 1 but shows a condition in which the vehicle has front end collision with an obstacle.
Figure 4A:
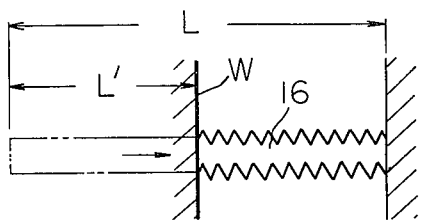
Figure 5:
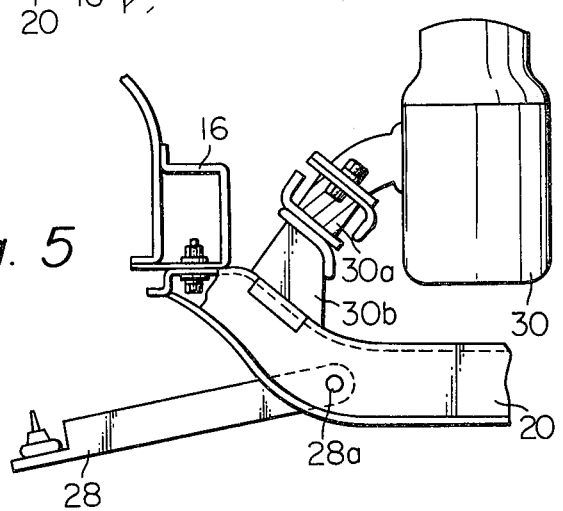
Figure 6:
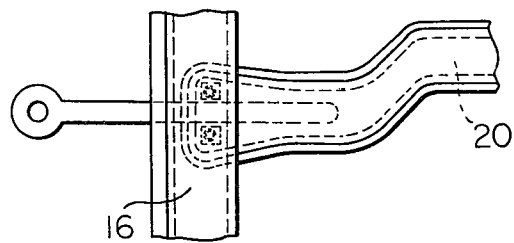
Figure 7A:
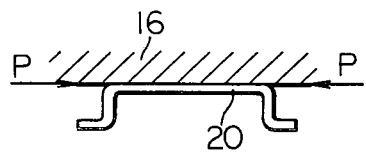
Figure 7B:
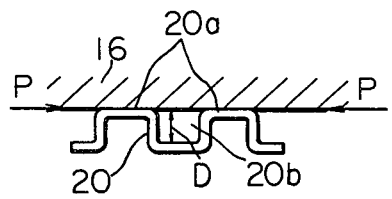
Figure 7C:
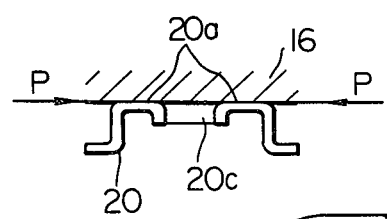
Figure 8:
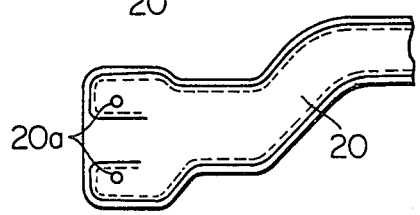
Figure 9:
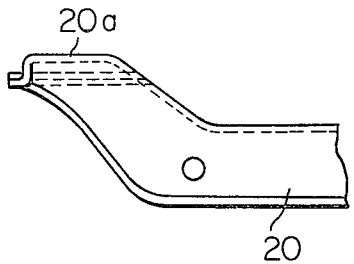
Figure 10A:
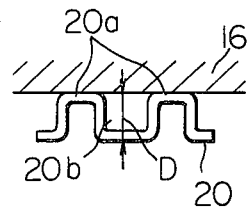
Figure 11:
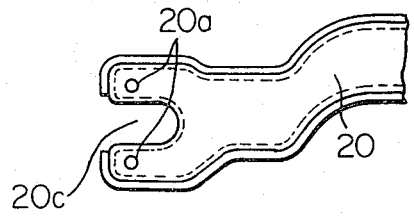
Figure 12:
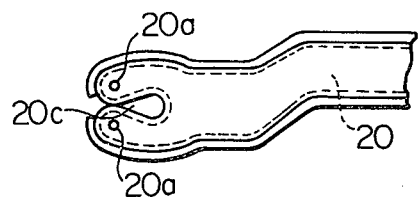
Figure 13:
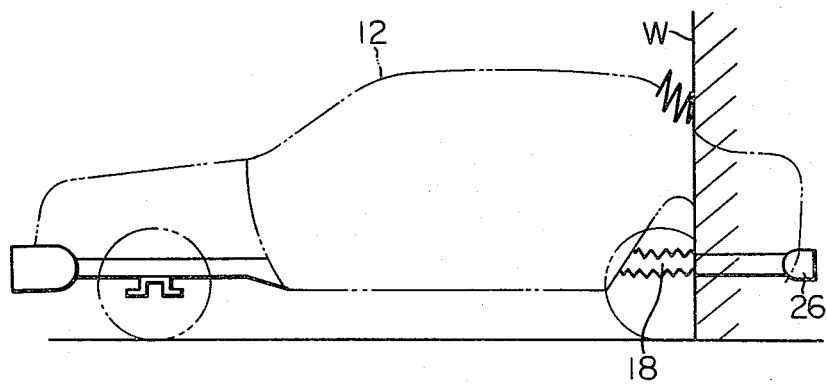
Figure 14A:
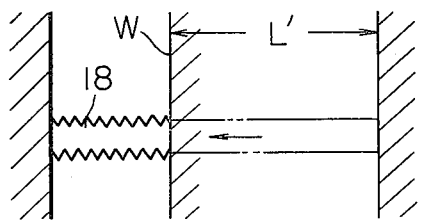
Figure 15A:
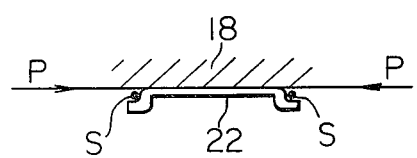
Figure 15B:
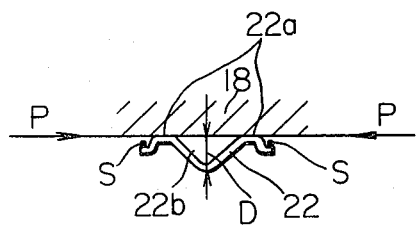
Figure 15C:
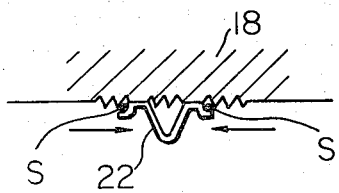

FIGS. 4a, b and c are schematic views comparing the extent of front rail contraction obtainable with a cross member configuration embodying the present invention with that of a conventional configuration;

FIG. 5 is a front plan view generally illustrating the arrangement of a front cross member;

FIG. 6 is a top plan view of an important part of the arrangement shown in FIG. 5;

FIGS. 7a, b and c are enlarged fragmentary side sectional views of a front cross member and a front rail connected with each other, in which FIG. 7a shows a conventional configuration and FIGS. b and c are preferred examples embodying the present invention;

FIGS. 8 and 9 are respectively a top plan view and a side elevation of a cross member of FIG. 7b;

FIGS. 10a and b are views similar to FIG. 7b and showing respectively a normal condition and a deformed condition;

FIGS. 11 and 12 are top sectional views of a cross member of FIG. 7c, respectively showing a normal condition and a deformed condition;

FIG. 13 is a view similar to FIG. 3 but showing the condition in which the vehicle has a rear end collision with an obstacle;

FIGS. 14a, b and c are schematic views comparing the extent of rear rail contraction obtainable with a cross member configuration embodying the present invention with that of a conventional configuration; and FIGS. 15a, b and c are enlarged fragmentary side sectional views of a rear cross member and a rear rail connected to each other in which FIG. 15a shows a conventional configuration, FIG. 15b a preferred example embodying the present invention as being in a normal condition, and FIG. 15c is similar to FIG. 15b but illustrates a deformed condition.

Figure 1:
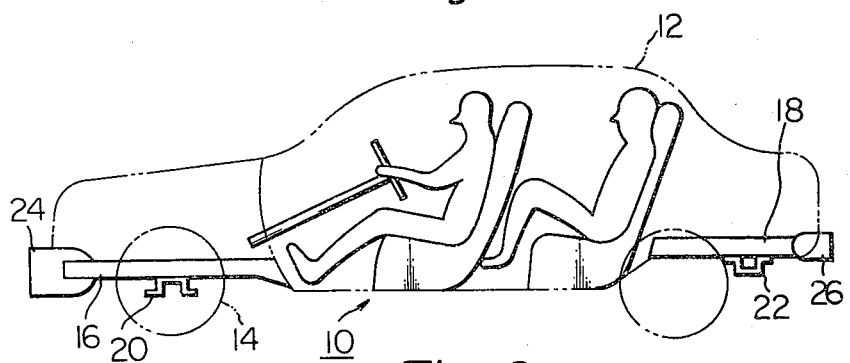
FIG. 1 is a side plan view of a motor vehicle incorporating the invention.
Figure 2:
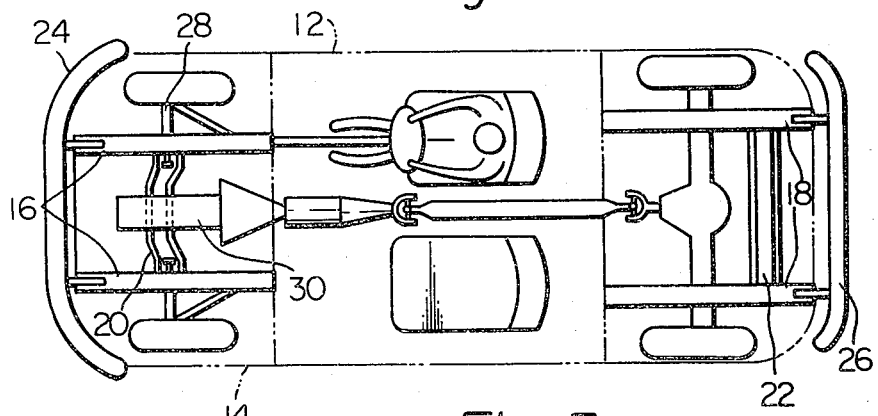
FIG. 2 is a top plan view of the vehicle of FIG. 1.

Referring to FIGS. 1 and 2, a numeral 10 generally designates a vehicle underbody including a passenger compartment 12 and an engine compartment 14. Indicated as 16 are a pair of deformable side members or front side rails which are equidistantly spaced on each side from the longitudinal center of the underbody 10. The front side rails 16 are shown as terminating short of the passenger compartment 12, although they may further extend rearward, if desired. At the rear of the vehicle, there are a pair of deformable side members or rear side rails 18 mounted in a manner similar to the front rails 16. In order to protect occupants against shock resulting from a collision or the like, each of these side rails 16 and 18 are configured in a known manner longitudinally deform or contract in response to an impact applied to the front or rear of the vehicle. To the forward end of the front rails 16 and to the rear end of the rear rails 18 are attached respectively a front bumper 24 and a rear bumper 26, through which impact energy is transmitted to the rails 16 and 18 during a collision. The front rails 16 are interconnected by a transverse member extending therebetween such as a profiled front suspension cross plate member 20 which serves for supporting a suspension linkage 28 and an engine front 30. The rear rails 18 are similarly interconnected by a profiled rear cross plate member 22 which serves for reinforcement of the frame. It would be apparent that several cross members other than those described may be mounted for further reinforcement. In a case where the front rails 16 and the rear rails 18 are intergrally fabricated, deformability is imparted only to the portion located in front and rear of the passenger compartment 12, the remaining portions being made rigid.

FIG. 5 illustrates in more detail the arrangement of the front rail, suspension cross member and associated components. The suspension linkage 28 is pivotally connected to the cross member 20 by a pin 28a, while an engine 30 also bears on the cross member 20 through resilient mountings 30a and a support bracket 30b. The cross member 20 is bolted or welded to the front rail 16 in a manner to be hereinafter fully discussed.

Figure 4B:
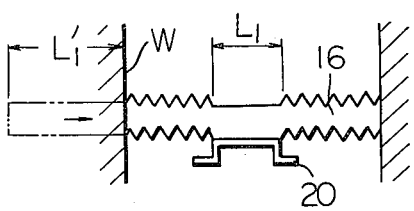
Figure 4C:
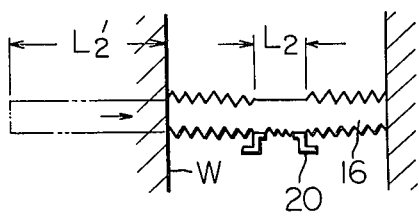

Bearing the general configuration described above in mind, the principle of the present invention will be discussed below. FIG. 3 illustrates the vehicle at the moment of a frontal collision at the front bumper 24 against a wall W, wherein the front rails 16 are contracted as shown. If, in this instance, the front rails 16 are free from connection with any cross member, a front rail 16 of length L would be permitted to contract by a length L' as seen in FIG. 4a. Actually, however, the cross member 20 is secured to the front rail 16 so that a length $L_1$ which corresponds to the width of the cross member 16 is not subject to significant contraction (see FIG. 4 (b)). Thus, the effective contractive length of the front rail 16 is expressed by $L_1' = L' - L_1$. FIG. 4c now represents the principle of the present invention, in which, since the width of the cross member 20 has a relatively large contractivity, the length $L_1$ of FIG. 4b is reduced to $L_2$ and therefore the contractive length increase to $L_2'$.

Figure 10B:
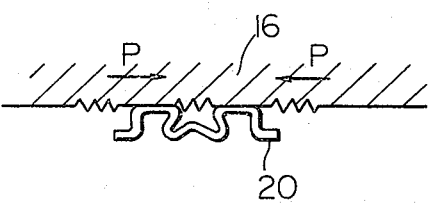

Referring to FIGS. 7, FIG. 7a illustrates a known manner of connecting the front rail 16 with the cross member 20. As shown, the cross member 20 is formed with a profile of generally inverted U-shape and at its top is secured to the bottom of the overlying front rail 16 along the full width of the cross member 20. The area in which the cross member 20 is connected to the front rail 16 is therefore relatively large, and undergoes very little deformation when a load P is applied to the front rail 16 in an arrow-indicated direction. According to one embodiment of the invention shown in FIG. 7b, the cross member 20 is formed with two spaced alternately profiled fixing portions 20a of generally inverted U-shape, by which the cross member 20 is connected to the front rail 16, the fixing portions 20a defining therebetween with the bottom of the front rail 16 a box-section space 20b. When the cross member 20 of FIG. 7b is viewed from the top, it presents the appearance of FIG. 8. Also the side elevation thereof is shown in FIG. 9. The underside of the front rail 16 is spaced from the bottom of the box-section space 20b by a distance D in a normal condition as shown in FIG. 10a. The cross member 20 thus profiled is allowed to deform upon collision as illustrated in FIG. 10b.

FIG. 7c, FIGS. 11 and 12 illustrate another example of a profiled cross member 20, in which a lower part of the cross member 20 below the box-section space 20b is cut off or removed forming an open space 20c for further deformability. It may be noted that the cross member 20 may be formed with more than two profiled fixing portions 20a.

Figure 14B:
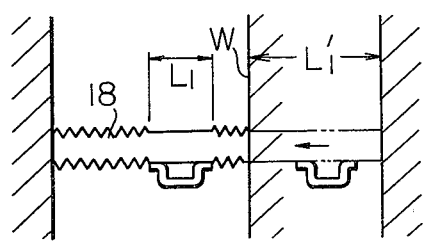
Figure 14C:
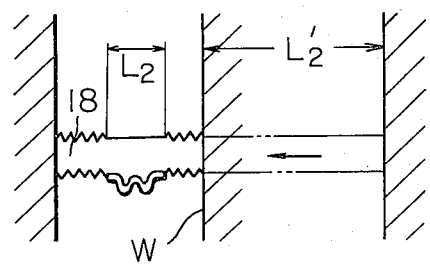

The rear rails 18 similarly tend to deform as in FIG. 13 when the vehicle collides with the wall W at its rear bumper 26. The principle of contraction of rear rails 18 of the invention is illustrated in FIG. 14c in comparison with that of an ideal configuration (no cross member) in FIG. 14a, and a conventional configuration in FIG. 14b, a detailed explanation of which is omitted for simplicity because it is substantially the same as for the front rails 16. The conventional rear cross member 22 is usually welded at S to the rear rails 18 in a manner shown in FIG. 15a. According to the present invention, the cross member 22 is profiled in a generally V-shape with two fixing portions 22a which with the underside of the rear rail 18 defined therewithin a space 22b of generally V-shape, the bottom of the space 22b being spaced from the underside of the rear rail 18 by a distance D as shown in FIG. 15b. The cross member 22 is secured to the rear rail 18 at these fixing portions 22a. Cross members 22 with profiles thus formed are advantageously deformable as seen in FIG. 15c. It is also possible to form more than two V-shaped profiles on the cross member 22.

Although the above description suggests that the U-shaped profile members are designed for front cross member applications while the V-shaped profile members are designed for rear cross member applications, either design may be applied either to a front or rear cross member.

It should be appreciated that, according to the present invention, an increased shock absorbing capacity is provided without any influence on the structural strength or other necessary properties of frame cross members. It will further be realized that members connected in the described manner are able to withstand higher torsional stress due to the configuration of their profiles. Further, members connected to side rails may not necessarily be a front suspension cross member or a rear reinforcement cross member, but may be any kind of member transversely extending from or between the side rails.

What is claimed i:

1. In a motor vehicle having a chassis, the improvement comprising at least one pair of laterally spaced elongated deformable side rails which extend longitudinally of the motor vehicle; and at least one plate cross member having at least two spaced fixing portions at each of the opposite ends thereof, said at least one plate cross member being secured to said deformable side rails only at said at least two spaced fixing portions, said spaced fixing portions, when so secured, being longitudinally spaced apart along the length of the side rails only at the positioof the fixing portions and in contact with a single wall surface of said side rails, each of said opposite ends having at least one recess at this position extending longitudinally between said two spaced fixing portions, whereby each of said opposite ends has reduced strength in the longitudinal direction of the motor vehicle.

2. An improvement as defined in claim 1, in which each of said opposite ends has at least one recess of U-shaped cross section.

3. An improvement as defined in claim 1, in which each of said opposite ends has at least one recess of V-shaped cross section.

4. In a motor vehicle having a chassis, the improvement comprising at least one pair of laterally spaced, longitudinally extending, deformable members; at least one plate cross member substantially perpendicularly extending between said deformable members said plate cross member being formed with multiple-profiles through which the plate cross member is fixed to said deformable members, wherein said at least one transverse member comprises a plurality of spaced fixing portions of substantially inverted U-shaped which define a substantially U-shaped box-section therebetween and with a free portion of said deformable member, and wherein a part of said substantially U-shaped box-section is removed.

* * * * *